United States Patent
Badstieber et al.

(10) Patent No.: US 9,971,898 B2
(45) Date of Patent: May 15, 2018

(54) METHOD AND SYSTEM FOR PROVIDING ANONYMIZED DATA FROM A DATABASE

(71) Applicant: Kabel Deutschland Vertrieb and Service GmbH, Unterfoehring (DE)

(72) Inventors: Harald Badstieber, Unterfoehring (DE); Daniel Guenther, Munich (DE); Jens von Knethen, Unterfoehring (DE); Viktor Palai, Unterfoehring (DE); Florian Mertl, Bad Aibling (DE)

(73) Assignee: KABEL DEUTSCHLAND VERTRIEB UND SERVICE GMBH (DE)

( * ) Notice: Subject to any disclaimer, the term of this patent is extended or adjusted under 35 U.S.C. 154(b) by 56 days.

(21) Appl. No.: 14/474,915

(22) Filed: Sep. 2, 2014

(65) Prior Publication Data

US 2015/0067881 A1    Mar. 5, 2015

(30) Foreign Application Priority Data

Sep. 3, 2013  (EP) .................................... 13182745

(51) Int. Cl.
*H04L 29/06* (2006.01)
*G06F 21/00* (2013.01)
(Continued)

(52) U.S. Cl.
CPC ........ *G06F 21/60* (2013.01); *G06F 17/30091* (2013.01); *G06F 21/6254* (2013.01); *H04L 63/08* (2013.01)

(58) Field of Classification Search
CPC ................ G06F 21/60; G06F 21/6254; G06F 17/30091; H04L 63/08
See application file for complete search history.

(56) References Cited

U.S. PATENT DOCUMENTS 6,515,215 B1   2/2003  Mimura
2004/0133547 A1*  7/2004  Doi ..................... G06Q 30/02
(Continued)

FOREIGN PATENT DOCUMENTS

DE    102004036697 A1   2/2005
EP        1705718 A1   9/2006
(Continued)

OTHER PUBLICATIONS

Xinqiang Ma et al., "Study on LogicSQL Database System in Security Problems", IEEE, 2011, pp. 532-536.
(Continued)

*Primary Examiner* — Lisa C Lewis
(74) *Attorney, Agent, or Firm* — Innovation Counsel LLP (57) ABSTRACT

The invention relates to a method for providing an anonymized value for a data element stored with an original value in a database of a database system, wherein the method comprises the following steps: (i) producing a supplementary data element for the data element stored in the database; (ii) determining the anonymized value of the data element from the original value on the basis of a mapping rule for ascertaining anonymized values that is stored in the database system, and storing the anonymized value in the supplementary data element; and (iii) linking the supplementary data element to the data element such that, based on the reception of an access command relating to the data element from a user connected to the database system, the supplementary data element is read and the anonymized value contained therein is transmitted to the user.

14 Claims, 3 Drawing Sheets

(51) Int. Cl.
*G06F 21/60* (2013.01)
*G06F 17/30* (2006.01)
*G06F 21/62* (2013.01)

(56) References Cited

U.S. PATENT DOCUMENTS

| | | | | |
|---|---|---|---|---|
| 2004/0260921 | A1* | 12/2004 | Treadwell | H04L 12/581 713/150 |
| 2006/0059148 | A1* | 3/2006 | Dunki | G06F 11/3672 |
| 2006/0168609 | A1* | 7/2006 | Chen | H04H 60/64 725/9 |
| 2010/0114920 | A1* | 5/2010 | Srivastava | G06F 21/6254 707/757 |
| 2010/0241753 | A1* | 9/2010 | Garbajs | H04L 63/0428 709/227 |
| 2011/0225200 | A1* | 9/2011 | Danis | G06Q 10/10 707/783 |
| 2013/0117170 | A1* | 5/2013 | Coppinger | G06Q 30/0207 705/35 |
| 2013/0282679 | A1* | 10/2013 | Khin | G06F 21/6254 707/698 |

FOREIGN PATENT DOCUMENTS

| | | | | |
|---|---|---|---|---|
| EP | 2426617 | * | 3/2012 | |
| EP | 2426617 | A1 | 3/2012 | |
| WO | 0118631 | A1 | 3/2001 | |
| WO | 0206948 | A1 | 1/2002 | |
| WO | 2010124850 | A1 | 11/2010 | |
| WO | 2010149948 | A2 | 12/2010 | |
| WO | WO 2010149948 | A2 * | 12/2010 | ....... G06F 17/30477 |

OTHER PUBLICATIONS

Lise Papotto, "Test Data Management Part 2—Data Privacy and Techniques for De-Identifying Test Data", 2004 Princeton Softech, Inc., pp. 1-4.
EP International Search Report corresponding to PCT/EP2014/068678, dated Jan. 21, 2015, 3 pages.
EP Search Report corresponding to EP 13182745, dated Feb. 20, 2014, 3 pages.
Supplementary EP Search Report corresponding to EP09734549, dated Jul. 29, 2014, 2 pages.

* cited by examiner

Fig.1

| First name | Surname | ... | Country | First name_A | Surname_A |
|---|---|---|---|---|---|
| Hans | Müller | ... | DE | Peter | Meister |
| Karl | Meier | ... | DE | Sebastian | Brunner |
| ⋮ | ⋮ | ... | ⋮ | ⋮ | ⋮ |

Fig. 2a

| First name | Surname | ... | Country |
|---|---|---|---|
| Hans | Müller | ... | DE |
| Karl | Meier | ... | DE |
| ⋮ | ⋮ | ... | ⋮ |

Fig. 2b

| First name_A | Surname_A | ... | Country |
|---|---|---|---|
| Peter | Meister | ... | DE |
| Sebastian | Brunner | ... | DE |
| ⋮ | ⋮ | ... | ⋮ |

METHOD AND SYSTEM FOR PROVIDING ANONYMIZED DATA FROM A DATABASE

BRIEF DESCRIPTION

The present invention is concerned with the provision of anonymized data in a database system. In particular, the invention relates to a method for providing an anonymized value for a data element stored with an original value in a database of a database system. In addition, the invention relates to a system and a computer program for performing the method.

BACKGROUND

Information that is needed by a company or another organization for performing the tasks provided in the company or the organization is usually stored in database systems. Thus, companies usually operate database systems that store, by way of example, person-related information from customers of the company, on the basis of which the company performs services for its customers, for example. In this case, the stored information frequently also comprises sensitive data, in particular sensitive personal data such as names, bank details or the like, which need to be protected against unauthorized access.

For many tasks that are performed on the basis of the stored information, access to the precise content of the information stored in the database system, including the sensitive data, is required. In the same way, however, provision may be made, by way of example, for the information stored in the database to be taken as a basis for making statistical evaluations that are reliant only on a portion of the data stored in the database system, while a large amount of further stored information is not relevant to the evaluations. In addition, provision may be made for the information stored in the database to be taken as a basis for producing test data that are used to test new data processing processes, for example, before they are implemented in the database system for execution in normal operation. In this case, the test data should have the greatest possible matches with the real data, but it is not usually necessary for the real data to be processed in test runs.

In order to protect the sensitive data stored in the database system during access for purposes of the aforementioned type in which the data content is not or only partially relevant, it is possible to use anonymized values instead of the real original values of the data elements. On the basis of such anonymized values, it is then possible to make statistical evaluations or test runs, for example, without having to reveal the real original values of sensitive data elements.

SUMMARY

It is an object of the present invention to provide such anonymized values of data elements stored in a database as easily and efficiently as possible. In particular, the option of being able to provide anonymized values needs to be able to be integrated into existing database systems as easily as possible.

This object is achieved by a method as claimed in claim 1, by a computer program as claimed in claim 13 and by a system as claimed in claim 14. Refinements of the method, the computer program and the system are specified in the dependent claims.

According to a first aspect, the invention proposes a method for providing an anonymized value for a data element stored with an original value in a database of a database system. The method comprises the following steps: (i) producing a supplementary data element for the data element stored in the database; (ii) determing the anonymized value of the data element from the original value on the basis of a mapping rule for ascertaining anonymized values that is stored in the database system, and storing the anonymized value in the supplementary data element; and (iii) linking the supplementary data element to the data element such that, based on the reception of an access command relating to the data element, which access command is sent by a user connected to the database system, the supplementary data element is read and the anonymized value contained therein is transmitted to the user.

According to a second aspect of the invention, a system for providing an anonymized value for a data element stored with an original value in a database of a database system is proposed. For the data element stored in the database, it is possible to produce a supplementary data element. In addition, the system is configured (i) to determine the anonymized value of the data element from the original value on the basis of a mapping rule for ascertaining anonymized values that is stored in the database system and to store the anonymized value in the supplementary data element, and (ii) to link the supplementary data element to the data element such that, based on the reception of an access command relating to the data element, which access command is sent by a user connected to the database system, the supplementary data element can be read and the anonymized value contained therein can be transmitted to the user. In order to determine the anonymized value and in order to store the anonymized value in the supplementary data element and also in order to link the supplementary data element to the data element, one embodiment of the invention has provision for an anonymization unit that may optionally also be configured to produce the supplementary data element.

Furthermore, the invention according to a further aspect proposes a computer program. This comprises a program code that contains commands in order to perform the method according to the invention and/or refinements of the method when the program code is executed on a processor.

One advantage of the invention is that the access to the anonymized values on the basis of the provided supplementary data elements can be performed in a similar manner to the access to the original values of the data elements. In particular, even access to the anonymized value involves a data element in the database being read without processes for producing the anonymized value needing to be integrated into the access process, for example. A further advantage is that access to the anonymized values can be carried out essentially just as quickly as access to the original values.

In one embodiment of the method, an authorization for the user to access the original value is checked on the basis of access authorization data stored in the database system, and the anonymized value is transmitted to the user if the result of the check is that the user is not authorized to access the original value. In an associated refinement, reception of a further access command relating to the data element from a further user is taken as a basis for transmitting the original value of the data element to the further user if it is established that the further user is authorized to access the original value.

In addition, in one refinement, the invention provides a database system that comprises a database and also the system described above. In addition, the database system contains a management unit that is configured to check an authorization of the user to access the original value of the data element based on the reception of an access command from a user, the access command relating to the data element and the checking being made using access authorization data stored in the database system, and to transmit the anonymized value to the user if the result of the check is that the user is not authorized to access the original value.

Advantageously, the aforementioned embodiments allow access authorization data that are stored in the database system to be able to be taken as a basis for transmitting either the original value of the data element or the anonymized value to a user. In this case, the authorization check performed for this purpose can likewise easily be integrated into an access control function that is often already set up in existing database systems.

A further embodiment of the invention is characterized in that the mapping rule is selected from a plurality of mapping rules for ascertaining anonymized values, which mapping rules are stored in the database system, on the basis of an association with the data element. This allows anonymized values for various data elements to be provided on the basis of different mapping rules matched to the respective data element.

In order to prevent the anonymized value from being able to be used to infer the original value of the data element, one embodiment of the invention provides for the mapping rules each to define irreversible mapping of original values onto anonymized values. To this end, the mapping rules may comprise what are known as hash functions and/or random functions, in particular. This allows particularly good protection to be achieved for original values. Equally, however, provision may be made for relatively simple mapping rules to be used if a lower level of protection for the original values is sufficient. This allows the computation complexity for ascertaining anonymized values to be reduced.

In addition, one refinement of the invention is characterized in that the mapping rule for ascertaining the anonymized value of the data element is designed such that the anonymized value has at least one predetermined property of the original value of the data element. Such a mapping rule that is provided with one or more properties of the original value of the data element allows the ascertainment of an anonymized value that can be processed in a similar manner to the original value of the data element. In addition, this allows a portion of the information content of the original value to be maintained, so that the anonymized value can be used to make statistical evaluations, for example, the results of which are also valid for the real data values, without revealing the complete real information content.

In one embodiment, the anonymized value is a character string having a length that is in a predetermined ratio to the length of the character string that forms the original value. In particular, it may be provided that the character strings that form the original value and the anonymized value are of the same length. In addition, in one embodiment, a predetermined component of a character string that forms the original value is transferred to the anonymized value. This component may be particularly a prefix and/or suffix of the character string forming the original value. In addition, one refinement of the invention involves that the original value coming from a prescribed value range and the associated anonymized value are selected from the same value range on the basis of the selected mapping rules.

In addition, the original value of the data element can occur precisely once within a group of data elements. This is the case, for example, when the original value of the data element is a unique identifier of a data record. For such a case, one refinement of the invention provides that the anonymized value ascertained on the basis of the mapping rules occurs precisely once within a group of supplementary data elements with anonymized values that is associated with the group of data elements. This also allows the anonymized value to be used as a unique identifier, for example.

In addition, sensitive information that is stored in the database system may contain personal names. In view of this, one embodiment of the invention involves that the original value of the data element and the anonymized value are different personal names. Hence, in this embodiment, the anonymized value is also a personal name and can immediately be recognized as such and processed as such.

On the basis of the aforementioned refinements, the invention allows properties of the original values to be retained when producing anonymized values. In further refinements, however, mapping rules can equally be prescribed such that particular properties of original values do not reappear in the anonymized values if this is desired.

BRIEF DESCRIPTION OF THE DRAWINGS

Exemplary embodiments of the invention are explained in more detail below with reference to the accompanying figures, in which.

DETAILED DESCRIPTION OF EMBODIMENTS

Figure 1:
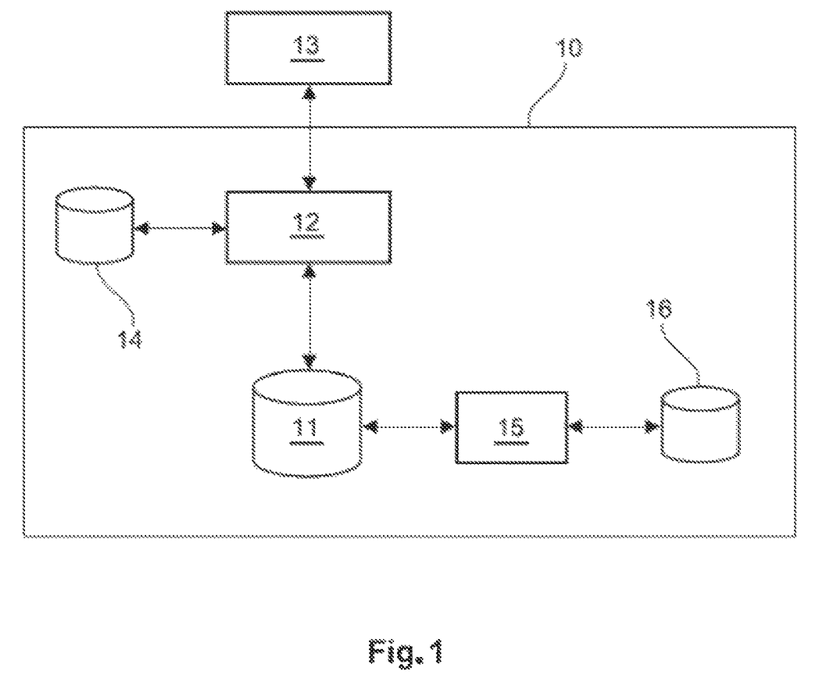
FIG. 1 shows a schematic illustration of a database system with a database, an associated management unit and an anonymization unit.

FIG. 1 schematically shows a database system 10 according to an exemplary embodiment of the present invention. By way of example, the database system 10 can be operated in a company. In this case, to which reference is also made below by way of example, the database system 11 may store, by way of example, person-related data from customers of the company and/or further data that are used during operation of the company. The invention is in no way limited to such a refinement, however. Instead, database systems 10 according to the invention can be used in many kinds of applications and can store any kinds of data in principle.

The database system 10 comprises a database 11 that is in the form of an electronic data memory that stores data within a prescribed data structure in a manner that is known per se to a person skilled in the art. In addition, the database system 10 contains a management unit 12 that organizes the storage of the data in the provided data structure in a manner that is likewise known per se to a person skilled in the art and that is used to perform external access to the data stored in the database 11. To this end, the management unit 12 comprises an appropriate software program that is executed on a processor of the database system 10.

External access can be performed by users of the database system 10 by using user devices 13, one of which is shown by way of example in FIG. 1. The user devices 13 are electronic data processing appliances that are connected to the database system 10, for example via a data network—not shown in the figure—or in another way, and are controlled by the users of the database system 10. These may be human operators or automatic processes that are performed in the user devices 13. If the database system 10 is operated by a company, as described above, then the user devices 13 of employees of the company, of customers or of suppliers may be involved, for example.

The data are stored in the database 11 within data elements that are arranged in accordance with the data structure provided with the database 11, and can be linked to one another. Within the provided data structure, the data elements each have one or more associated descriptors that, in particular, allow the data elements to be addressed in the event of external access to the database 11. In this case, single, or all the, data elements may have individual descriptors uniquely associated with them. In addition, descriptors can be associated with prescribed groups of data elements, so that the data elements in this group can be addressed as a whole using a single descriptor. In this case, particularly the association of descriptors with groups of data elements can result from a particular arrangement of the relevant data elements within the provided data structure.

Suitable data structures are basically any data structures known per se to a person skilled in the art that can be used in databases. An example of a data structure that may contain data elements stored in the database 11, and to which reference is made by way of example below, is storage of the data elements in one or more tables. In this case, the data elements in the rows of a table each form what is known as a data record. The data elements of such a data record that are associated with the individual table columns contain what are known as the attributes of the data record. In this case, the names of these attributes, i.e. the names of the columns of a table, can be used as descriptors for access to the data elements. Similarly, a name for the entire table may be a descriptor for the data elements contained in the table. If the database stores a plurality of tables, the complete descriptors can furthermore be formed by combinations of the aforementioned table-related descriptors, particularly by a combination of the table name with an attribute name or column name or of column and row numbers. In addition, provision may be made for single data elements to be able to be addressed individually, for example on the basis of the name of the table in which they are stored, and also their respective row number and column number.

If the data stored in a table are customer data for a company, then in one embodiment, each data record may be associated with precisely one customer. Those attributes of the data records that are used as descriptors may comprise, by way of example, explicit identification numbers associated with the customers, first names and surnames, dates of birth, components of the mailing addresses of the customers and any other data associated with the customers whose values are respectively stored in a data element of the data records. Using the descriptors that correspond to the attributes, it is therefore possible for a single access command, for example, to be used to access names and dates of birth of all customers whose customer data are stored in the table.

The values of the data elements stored in the database 11 may comprise any character strings in principle. In this case, the values of individual data elements or groups of data elements—such as the data elements in the column of a table—may have particular defined properties, however. These may be specified in what are known as metadata that are stored in addition to the data elements in the database 11. In this case, the management unit 12 can use the properties stored in the metadata to perform data integrity checks, for example, which involve checking whether the data elements have the allocated properties. In addition, the values may also have properties that are not stored in metadata, however (for example the property of being a name of a person).

The properties of the data values stored in the database 11 determine the possible operations that can be performed with the data values (for example computation operation for numbers or alphabetic sorting of letter sequences). In addition, the properties are linked to the content semantics, i.e. to the significance that the data values have for the users of the database system 10, for example. In particular, the significance of the data can be revealed not exclusively on the basis of names of attributes or other metadata associated with the data but also by the (visible) properties of the data elements.

Of particular interest in this case are properties that are common to the values of particular groups of data elements, for example to the data elements that belong to a particular attribute. Some such properties are listed by way of example below.

By way of example, one possible property is the length of the character strings that form the data values, said length being able to be precisely stipulated or limited to a maximum and/or minimum value. A further property may be the types of characters from which the character strings that form the values are constructed. Thus, particular data elements may be formed exclusively by digits or letters or may be constructed from a combination of digits and letters. In addition, for values of data elements that represent numbers, the type of the number and/or a value range may be prescribed, possible types of numbers being able to comprise natural numbers, integers and floating-point numbers having a prescribed number of floating decimal digits, for example. In addition, the properties may relate to the format of the possible values of data elements. By way of example, possible formats may provide for the values to comprise a plurality of groups of characters that, for their part, may have particular properties and/or be connected to one another in a prescribed manner—for example by prescribed characters. Examples of these are date formats or formats of web and e-mail addresses, for example. In particular, the format can also be used to prescribe that the values have prescribed prefixes and/or suffixes. A further property of a data element may be the occurrence of its value precisely once within a prescribed group of data elements. This property is possessed particularly by data elements that store identification numbers or the like. In addition, data elements may, as already stated previously, have the property of being names of persons.

Beyond the aforementioned examples, a person skilled in the art is aware of further properties of data values that the data values that are stored in a database 11 of a database system 10 according to the invention may have.

Possible access to the data stored in the database 11 comprises, inter alia, database queries for reading data elements. In order to make such a database query, a user transmits an appropriate access command to the management unit 12 of the database system 10, said access command including a descriptor to specify the data elements that are to be read. When the management unit 12 receives such a command, it identifies the data elements affected by the access command from the specified descriptor within the data structure of the database 11, reads these data elements (or associated supplementary data elements, which will be explained more precisely below) and transmits the read values to the querying user. Similarly, the users can use appropriate commands that are implemented by the management unit 12 in order to alter values of data elements, to erase data elements and to create data elements within the data structure, for example. In this case, the command language used for the access commands for the database 11 may, in principle, be any database language that is known to a person skilled in the art, such as SQL.

In addition, the management unit 12 can provide a function for controlling the access by users 13 to the database 11, which function comprises checking authorizations for users to access the database 11. This check is preferably performed on the basis of user authorization data that are stored in a separate user authorization database 14 in the database system 10 shown by way of example in FIG. 1. Equally, however, provision may also be made for the user authorization data to be stored in another way, for example in the database 11 itself. The user authorization data specifies for individual users and/or groups of users those data elements stored in the database 11 that the respective users or groups of users may access. To this end, the user authorization data may contain, by way of example, associations between users or user groups and descriptors of the data elements to which access is permitted. In addition, the permitted types of access, i.e. whether read and/or write access to particular data elements is permitted and whether data elements may be produced and/or erased, may be specified, with one refinement allowing users and/or user groups to be permitted different types of access for different data elements.

The access authorization is preferably checked when the management unit 12 receives an access command from a user device 13. The reception of the access command is taken as a basis for first of all identifying the user controlling the user device 13 and for possibly ascertaining one or more user groups with which the user is associated. By way of example, the user identification or the ascertainment of the user group of the user can be performed on the basis of a user identifier transmitted together with the access command. Furthermore, in one refinement, user authentication is also provided. To this end, any authentication method that is known per se to a person skilled in the art can be used in principle. By way of example, the management unit 12 can check an authentication feature that is likewise transmitted together with the access command, such as a password associated with the user. Following the identification of the user or the ascertainment of the user group of the user, the management unit 12 uses the user authorization data stored in the user authorization database 14 to determine whether the user is authorized to perform the access specified in the access command to the data elements that are specified in the access command. Only if this is the case does the management unit 12 execute the access command.

As described above, users can use user devices 13 to access original values of the data elements stored in the database 11, given appropriate authorization. These original values usually correspond to the real circumstances that are mapped in the database 11 and that are captured in a suitable fashion and stored in the database 11 in a manner that is known per se to a person skilled in the art. In particular, the original values may be the real customer data for a company, for example, which contain the actual personal information from the customers of the company.

In addition, the database system 10 allows anonymized values for data elements to be provided and these to be transmitted to a user instead of original values when the database 11 is accessed. To this end, the database system 10 comprises particularly an anonymization unit 15 that is set up to ascertain and provide anonymized values from the original values. Preferably, the anonymization unit 15 is likewise implemented in the form of a software program that is executed on a processor of the database system 10. In this case, the anonymization performed can be performed for all data elements stored in the database 11 or just for a portion of these data elements, which are subsequently also referred to as data elements worthy of protection. These may contain particularly sensitive person-related information, for example, that is contained within a person-related stock of data that is stored in the database 11.

In order to provide anonymized values, supplementary data elements are produced for the data elements that are to be anonymized, and the supplementary data elements are linked to the data elements containing the original values (these are subsequently also referred to as original data elements) such that the management unit 12 is capable, on the basis of the reception of an access command, of ascertaining and reading the respective data elements linked to the original data elements. The anonymization unit 15 then uses the original values stored in the original data elements to calculate anonymized values, which are stored in the supplementary data elements, where the anonymized value ascertained from an original value is stored in the supplementary data element that is linked to the original data element containing the original value. In a preferred refinement, the anonymization unit 15 is also configured to link the supplementary data elements to the data elements containing the original values or to set up the relevant links in the database system 10. In addition, the anonymization unit 15 can also produce the supplementary data elements in one embodiment. In further refinements, the supplementary data elements can likewise be produced by another unit, such as the management unit 12, however.

By way of example, the link between an original data element and a supplementary data element can be made by virtue of a descriptor for the original data element being associated with the supplementary data element. In addition, such a link involves the supplementary data element being provided with a marker that identifies it as a supplementary data element and hence renders it distinguishable from the original data element. In one refinement, this marker may be additionally included (for example as a prefix or suffix) in the descriptor. The descriptor associated with the supplementary data element may be explicitly associated with the original data element. Equally, however, the link between an original data element and a supplementary data element can also be made by virtue of a group of supplementary data elements having a descriptor for the associated group of original data elements associated with it and being provided with a supplement. In this case, a unique link between original data elements and supplementary data elements may additionally result from the arrangement of the linked data elements within the provided data structure of the database 11.

Figure 2A:
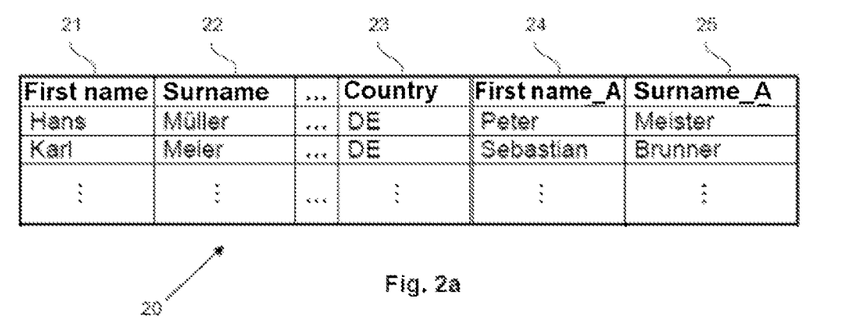
FIG. 2a shows an exemplary illustration of a table that is stored in the database that is shown in FIG. 1, with added supplementary data elements.

FIG. 2 illustrates such linking of original/supplementary data element by way of an exemplary table. The table shown stores person-related information from persons. The data records that the table contains, i.e. the rows of the table, each relate to one person and contain a number of prescribed attributes that are each specified in a column of the table. The attributes provided by the table shown in FIG. 2 are the first name of the person (in column 21), the surname of the person (in column 22) and the country in which the person lives (in column 23). Furthermore, the table may contain any further attributes, which are not shown in FIG. 2.

In the example shown, the anonymization is not performed for all the data elements that the table contains but rather is performed for prescribed attributes that are worthy of protection. In this case, it is assumed that the anonymization is performed for the first name, specified in the first column 21, and the surname, specified in the second column 22, while no anonymization is performed for the further attributes, such as particularly the country, stored in the last shown column 23. In order to anonymize columns 21 and 22, the anonymization unit 15 produces a respective supplementary column 24 or 25 that is inserted into or appended to the table. In this case, the supplementary column 24 is assigned to the "first name" attribute in column 21, and the supplementary column 25 is assigned to the "surname" attribute in column 22. The link between the original data elements and the supplementary data elements is made by virtue of supplementary columns 24 and 25 each being provided with the descriptor of the associated original column. In addition, these descriptors have a suffix (in this case the suffix "_A") appended to them in order to identify the supplementary columns as such. In this refinement, the supplementary data elements that the supplementary columns 24 and 25 contain become components of the data records that the table contains, so that a unique association is obtained between original data elements and supplementary data elements. Thus, by way of example, the original data element that the first column contains for the "first name" attribute (value: "Hans") has the associated supplementary data element with the "first name_A" attribute of the same data record (value: "Peter").

In further refinements, the link between original data elements and supplementary data elements can also be made in another way. By way of example, the link can be set up by using indices or references that are connected to the original data elements and that each refer to the associated supplementary data element.

The production of the anonymized values is performed by the anonymization unit 15 by using mapping rules. In the case of the database system 10 shown in FIG. 1, these mapping rules are stored in a rule database 16 that is set up in addition to the database 11 in the database system 10. Equally, however, provision may also be made for the mapping rules to be stored in the database 11 in a particular, logically separate memory area, for example.

For various single original data elements or groups of original data elements in the database 11, different mapping rules can be stored in the rule database 16. The association between mapping rules and data elements that are to be anonymized is likewise stored in the rule database 16. In order to produce the anonymized values of the original data elements that are worthy of protection, the anonymization unit 15 therefore first of all ascertains in the rule database 16 the mapping rules that are respectively associated with the data elements that are to be anonymized. The anonymization unit then applies the ascertained mapping rules to the data values of the data elements that are to be anonymized and thus calculates the anonymized values, which are then stored in the supplementary data elements. By way of example, the association between mapping rules and data elements can be made on the basis of the descriptors of the data elements. In this case, mapping rules can be individually associated with single data elements. Equally, groups of data elements, such as the data elements in a table that belong to an attribute, can each be uniformly assigned one mapping rule. In particular, a group of data elements of the same type can in this way be linked to a common mapping rule that associates the original values of the group members with anonymized values in the same way.

The mapping rules are preferably prescribed by an administrator and stored in the rule database 10, the administrator having special access authorization for the rule database for this purpose. In addition, the administrator also stipulates those data elements in the database 11 that are worthy of protection and associates with them the respective data elements that are anonymized using the relevant mapping rule.

On the basis of the mapping rules, the anonymization is performed—given appropriate configuration of the mapping rules—such that it is not possible to infer the original values from the anonymized values. The mapping rules therefore define irreversible mappings of the original values onto the anonymized values. In particular, the mapping rules may comprise, by way of example, hash functions or a hash algorithm that results in a certain number of collisions in which a plurality of original values are mapped onto the same anonymized value. On the basis of this collision, it is not possible for the original value to be determined uniquely from the anonymized value. In addition, the mapping rules may comprise random algorithms that are used to produce a random mapping specification for original values onto anonymized values. Random mapping specifications of this kind likewise do not allow the original value to be inferred from an anonymized value.

The invention is not limited to mapping rules of the type cited previously, however. Thus, by way of example, it is also possible to use relatively simple mapping rules for ascertaining the anonymized values, which alter particular positions in the original value on the basis of a regular pattern, for example. Although such mapping rules usually allow the original values to be inferred from the anonymized values in principle (for example by comparing a plurality of anonymized values), the computation complexity for ascertaining the anonymized values is usually lower. Such relatively simple mapping rules are suitable for applications or data elements in which a lower level of protection for the original values is sufficient.

In addition, the anonymized values can be produced on the basis of the mapping rules preferably such that particular properties of the associated original values are retained if this is desired. The effect achieved by this is that the usability of the values is retained, at any rate in part, following the anonymization. In particular, provision may be made for the mapping rules to be designed such that anonymized values have comparable content semantics to the original values. The effect achieved by this is that the anonymized values can be processed in a similar manner to the original values. In addition, the processing by human users is facilitated, these usually also being guided by the significance of data values when controlling data processing processes, for example.

The properties to be obtained may, in principle, be any single one or a combination of the properties cited previously by way of example. Thus, by way of example, the length and/or the type of character of the character string forming the original value may be retained. Character strings that have a particular data format are also preferably mapped onto anonymized character strings having the same format. This allows or facilitates the processing of the anonymized values by programs that presuppose particular types of character or data formats.

In addition, provision may be made for prescribed components of the character strings from original data elements to be retained when ascertaining the anonymized values. By way of example, this allows the anonymized values from data elements stored in the database 11 to be taken as a basis for making statistical evaluations, the results of which are also valid for the real data. Thus, by way of example, provision may be made for the ascertainment of anonymized values of zip codes that personal addresses contain to involve retaining those digits that identify the region (that is to say the first two digits in the five-digit German zip codes, for example). During statistical evaluation of the anonymized data, it is therefore possible to ascertain the (real) distribution of customers over the provided zip code regions, for example, without having to access the real data.

In addition, mapping rules can be prescribed that are used to map names of persons (the first names and/or surnames) onto fictitious names, so that the anonymized values can also be recognized as names and can be processed as such. To achieve this, one refinement provides for a list containing a particular number of fictitious names to be produced first of all (at least some of these names may match original names occurring in the database 11). A prescribed algorithm is then used to produce from each original name a respective hash value within a value range that corresponds to the number of fictitious names. The anonymized value selected for the original name is then that entry from the fictitious name list that corresponds to the hash value. The number of fictitious names and accordingly the value range of the possible hash values are preferably chosen to be relatively small in comparison with the number of real names that occur. The effect achieved by this is that a plurality of real names are respectively mapped onto a single fictitious name, with the possibility of such collisions preventing the real name from being able to be explicitly inferred from a fictitious name. In this case, the effect achieved by the use of a hash function is that a particular (repeatedly occurring) real name is always mapped onto the same fictitious name. This property may be of interest for statistical evaluation of the anonymized data elements, for example, in order to obtain results that are also valid for the real data. In an alternative refinement, however, provision may likewise be made for a random value, instead of the hash value, to be ascertained from the original value and for the fictitious name to be selected from the fictitious name list on the basis of this random value. As a result, a repeatedly occurring real name is not always mapped onto the same fictitious name.

In addition, provision may be made for the uniqueness of original values of data elements, such as customer numbers, to be retained for the ascertainment of the anonymized values. This is expedient particularly when the anonymized data values are intended to be used to simulate or test business processes that are controlled on the basis of unique data values. To retain the uniqueness, provision may be made, by way of example for the possible original values to be entered into a list in a random order and for the anonymized value selected for an original value to be the list entry that corresponds to the original value (that is to say the third list entry for the original value "3", for example). In this case, it may additionally be provided to split the value range of the possible original numerical values according to the number of digits and to produce for each subrange a list containing a random arrangement of the numerical values that it contains, from which list the anonymized value is then selected. The effect achieved by this is that the anonymized value has the same number of digits as the original value.

While the mapping rules cited above by way of example ensure the smallest possible discrepancies between original values and anonymized values, mapping rules that allow greater discrepancies between the original values and anonymized values can also be prescribed for particular data elements and/or groups of data elements. Such mapping rules can be used when a greater level of disassociation is desired for the original values. An example of one such mapping rule is the per-se known "cross-out", in which the characters in the character string forming the original value are replaced by a particular prescribed character, such as an "X".

In particular, mapping rules can also be prescribed in this case such that particular properties of the original values are disassociated in a specific manner if this is desirable in an application or for particular data elements. To this end, mapping rules are prescribed for the relevant data elements, which mapping rules are designed such that the anonymized values calculated using the mapping rules do not have one or more prescribed properties of the original values.

In the manner described above, the anonymization unit 15 can produce anonymized values for data elements that are worthy of protection, and can store them in the database 11, independent of access by user terminals 13 to the data elements. In this case, the production and storage of the anonymized values can be performed in a standard anonymization pass for all the data elements worthy of protection that are stored in the database 11 at a particular point in time, for example. If new data elements worthy of protection are produced in the database 11, for example on account of the capture of further data, it is possible for anonymized values for these data values to be produced in further anonymization passes and stored in the database 11. If new data elements are regularly produced in the database 11, as is often the case with databases for storing customer data, the anonymization passes can be performed regularly, for example daily. Equally, it is possible for anonymization passes to be performed on the basis of need. In order to limit each of the anonymization passes to those data elements worthy of protection for which an anonymized value has not previously been calculated and stored in the database 11, provision is preferably made for those data elements worthy of protection that have no associated supplementary data element with an anonymized value to be ascertained first of all before each anonymization pass. Only for these data elements worthy of protection are supplementary data elements then produced that are used to store anonymized values.

The access to the supplementary data elements that are stored in the database 11 and include the anonymized values is effected by means of the management unit 12 of the database system 10 in conjunction with access requests that are sent by user devices 13. On the basis of the supplementary data elements provided in the database 11, the management unit is capable of transmitting either the anonymized values or the original values of data elements to the users on the basis of access requests from users. In this case, the access to the original values is effected in the manner already described above. When an anonymized value of a data element is accessed, the management unit 12 ascertains the supplementary data element on the basis of the described link between the original data element and the supplementary data element. The management unit then reads the ascertained supplementary data element and transmits the read anonymized value to the user.

Figure 2B:
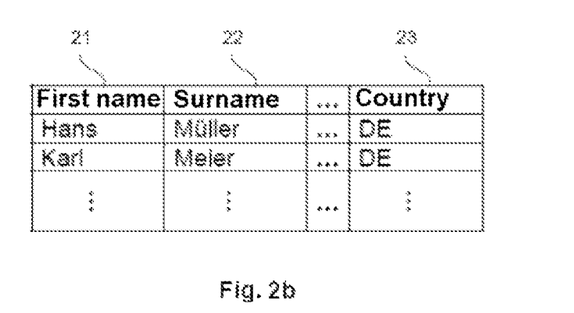
FIG. 2b shows a form in which the table shown in FIG. 2a is transmitted with original values of data elements worthy of protection.
Figure 2C:
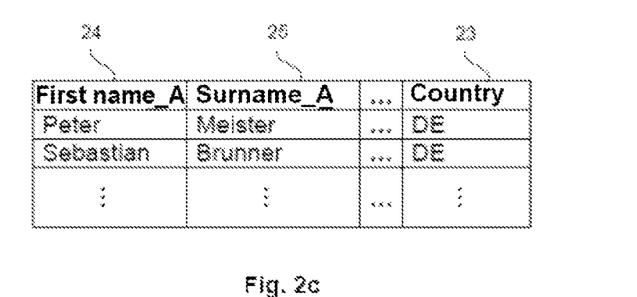
FIG. 2c shows a form in which the table shown in FIG. 2a is transmitted with anonymized values instead of the original values of the data elements worthy of protection.

For the table 20 shown in FIG. 2*a*, FIG. 2*b* provides an exemplary illustration of the form in which the table is transmitted on the basis of an access command transmitted for the entire table when the original values of the data elements are transmitted. As is evident, the transmitted table contains original values (and attributes) of columns 21 and 22 that are worthy of protection and also the columns that are not worthy of protection, particularly column 23. By contrast, FIG. 2c shows the form of the table when anonymized values are transmitted to a user. In this case, the table contains supplementary columns 24 and 25 instead of original columns 21 and 22 that are worthy of protection. The columns that are not worthy of protection, particularly column 23, are likewise contained.

Access to the anonymized values can therefore be performed by means of management unit 12 in a similar manner to the access to the original values, in principle. It is merely necessary for the management unit 12 to follow a link to the supplementary data element when an anonymized value is to be read. This functionality can usually be implemented in a relatively simple manner in a management unit 12 of a database system, so that, in particular, it is a simple matter to adjust the existing database such that it provides anonymized values in addition to the original values of data elements.

Whether the original value or the anonymized value is transmitted to a user who sends an access command to the management unit 12 is preferably dependent on prescribed access rights of the user. In this case, provision is made for different access authorizations to be stipulated for different users or user groups for those data elements worthy of protection stored in the database 11 that have associated supplementary data elements with anonymized values. In this case, a first user authorization allows access to the original values of the data elements worthy of protection. By contrast, a second user authorization allows access to the anonymized values but not to the original values. These access authorizations may be provided in addition to the access authorizations described above that stipulate whether a user device 13 or a user is generally permitted to access a data element and what types of access may be permitted. In addition to these access authorizations, the first and second access authorizations for accessing the original values or anonymized values may be stored in the authorization database 14 of the database system 10.

Figure 3:
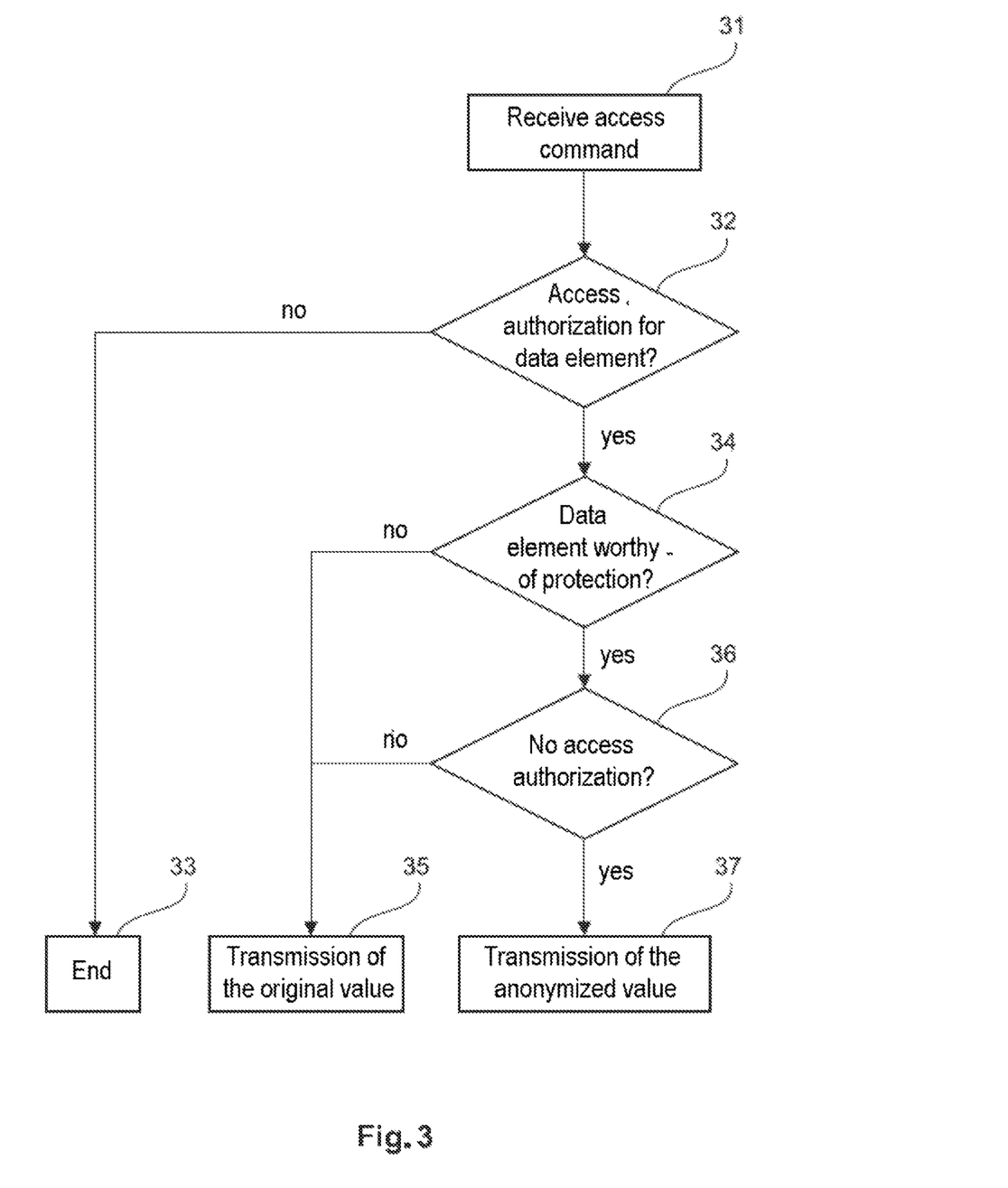
FIG. 3 shows a schematic flowchart that illustrates the transmission of values of data elements to a user by the database system shown in FIG. 1.

Using the aforementioned first and second access authorizations and possibly the further access authorizations that relate to general access to the data elements, an access command transmitted by a user appliance 13 is handled, by way of example, as explained below with reference to the flowchart shown in FIG. 3.

First of all, the management unit 12 of the database system 10 receives the access command from the user terminal 13 of a user (step 31). The user is then preferably identified and authenticated in a manner described above. In addition, the descriptor specified in the access command is used to ascertain those data elements in the database 11 to which the access command relates. In one refinement, the access authorizations stored in the authorization database 16 are then used to check whether the user terminal 13 or the user using the user terminal 13 is generally authorized for the desired access (i.e. in the present case for reading the data elements specified using the descriptor) (step 32). If the management unit 12 establishes that this is not the case, access is terminated and preferably an appropriate notification is sent to the user terminal (step 33).

If, by contrast, it is established that general authorization exists for (read) access to the data elements, a check is performed to determine whether or not the data elements are data elements worthy of protection (step 34). To this end, the management unit 12 checks whether the data elements denoted in the access command have associated supplementary data elements with anonymized values. In one refinement, provision may also be made for the data elements in the database 11 that are worthy of protection each to be provided with an appropriate identifier, which may be contained in the metadata of the data elements. In this case, the management unit 12 can, if such an identification is present, establish that a data element worthy of protection is involved without having to ascertain the associated supplementary data element in order to do so.

If the management unit 12 establishes that the data elements denoted in the access command do not comprise data elements that are worthy of protection, the management unit 12 reads the original values from the relevant data elements and transmits them to the user terminal 13 from which the access command has been received (step 35). If, by contrast, the management unit 12 establishes that the access command relates to data elements that are worthy of protection, the access authorizations stored in the authorization database 14 are used to check whether the user is authorized for (read) access to the original values of the data elements or there is just access authorization for the anonymized values (step 36). If this establishes that the user is permitted to access the original values, the latter are read from the relevant data elements and transmitted to the user device 13 (step 35). If there is just access authorization for the anonymized values, the supplementary data elements associated with the data elements are read and the anonymized values they contain are transmitted to the user appliance 13 (step 37). For this purpose, the management unit 12 determines the supplementary data elements associated with the original data values in the manner described above on the basis of matching descriptors, if this has not already taken place previously (in step 34).

In further refinements, it is possible to dispense with the check—performed in step 32—on the general authorization of the user for the data elements specified in the access command. By way of example, provision may be made for this when all users connected to the database system 10 have general access authorization for the data stored in the database 11. In this case, the management unit 12 checks whether the access command relates to data elements worthy of protection immediately after receiving said access command.

The invention claimed is:

1. A computer-implemented method for providing an anonymized value for an original data element stored with an original value in a database of a database system, wherein the method comprises the following steps:
producing a supplementary data element corresponding to the original data element stored in the database;
determining the anonymized value of the original data element from the original value on the basis of a mapping rule for ascertaining anonymized values, the mapping rule being stored in the database system;
storing the anonymized value in the supplementary data element and storing the supplementary data element including the anonymized value in the database;
wherein the supplementary data element is produced and stored in the database independent of an access to the original data element by a user connected to the database system,
and wherein the method further comprises linking the supplementary data element to the original data element such that in response to the reception of an access command relating to the original data element, wherein the access command is sent by a user, the supplementary data element is read and the anonymized value contained therein is transmitted to the user connected to the database system.

2. The method as claimed in claim 1, further comprising:
checking an authorization for the user to access the original value on the basis of access authorization data stored in the database system, and
conditionally transmitting the anonymized value to the user if the result of the checking is that the user is not authorized to access the original value.

3. The method as claimed in claim 2, further comprising:
receiving a further access command relating to the original data element from a further user; and
in response to the receiving, conditionally transmitting the original value of the original data element to the further user if it is established that the further user is authorized to access the original value.

4. The method as claimed in claim 1, wherein the producing, the determining, and the storing occur independent of the reception of an access command.

5. The method as claimed in claim 1, wherein the mapping rule is selected from a plurality of mapping rules for ascertaining anonymized values, on the basis of an association with the original data element, and wherein the mapping rules are stored in the database system.

6. The method as claimed in claim 5, wherein the mapping rules each define an irreversible mapping of original values onto anonymized values.

7. The method as claimed in claim 5, wherein the original value falls within a predetermined value range and the associated anonymized value is selected from the same value range on the basis of the selected mapping rule.

8. The method as claimed in claim 1, wherein the mapping rule is designed such that the anonymized value has at least one predetermined property of the original value of the original data element.

9. The method as claimed in claim 1, wherein the anonymized value is a character string having a length that is a predetermined function of the length of the corresponding character string that forms the original value.

10. The method as claimed in claim 1, wherein the determining further comprises transferring a predetermined component of a character string that forms the original value to the anonymized value.

11. The method as claimed in claim 1, wherein the original value of the original data element occurs precisely once within a group of data elements, and wherein the anonymized value ascertained on the basis of the mapping rule occurs precisely once within a group of supplementary data elements having anonymized values that are associated with the group of data elements.

12. The method as claimed in claim 1, wherein the original value of the original data element and the anonymized value are different personal names.

13. A system comprising a processor and a memory for providing an anonymized value for an original data element storing an original value in a database of the database system,
wherein the processor is programmed:
to generate a supplementary data element for the original data element stored in the database,
to determine the anonymized value of the original data element from the original value on the basis of a mapping rule for ascertaining anonymized values, mapping rule being stored in the database system
to store the anonymized value in the supplementary data element, and
to store the supplementary data element including the anonymized value in the database,
wherein the processor is further configured:
to produce the supplementary data element and to store the supplementary data element in the database independent of an access to the original data element by a user connected to the database system, and
to link the supplementary data element to the original data element such that in response to the reception of an access command relating to the original data element, wherein the access command is sent by a user, the supplementary data element is read and the anonymized value contained therein is transmitted to the user connected to the database system.

14. The system as claimed in claim 13 further programmed to check an authorization of the user to access the original value of the original data element based on the reception of an access command from a user, the access command relating to the original data element, and the check being performed using access authorization data stored in the database system, and further programmed to transmit the anonymized value to the user if the result of the check is that the user is not authorized to access the original value.

* * * * *